(12) United States Patent
Putcha et al.

(10) Patent No.: US 7,436,811 B2
(45) Date of Patent: *Oct. 14, 2008

(54) MULTICASTING DATA METHOD IN A RADIO COMMUNICATION SYSTEM

(75) Inventors: Padmaja Putcha, Gurnee, IL (US); Richard C. Burbidge, Hook (GB); Zhijun Cai, N. Richard Hills, TX (US); Kenneth A. Stewart, Grayslake, IL (US)

(73) Assignee: Motorola Inc, Schaumburg, IL (US)

( * ) Notice: Subject to any disclaimer, the term of this patent is extended or adjusted under 35 U.S.C. 154(b) by 617 days.

This patent is subject to a terminal disclaimer.

(21) Appl. No.: 10/751,080

(22) Filed: Jan. 2, 2004

(65) Prior Publication Data
US 2006/0126590 A1 Jun. 15, 2006

(51) Int. Cl.
*H04L 12/28* (2006.01)
(52) U.S. Cl. .................. 370/343; 370/390; 370/347; 455/450; 455/414.1; 725/132; 725/140; 725/50
(58) Field of Classification Search ............... 370/343, 370/390, 347, 281, 329, 480, 494, 495, 312; 455/450, 414.1; 725/132, 140, 50
See application file for complete search history.

(56) References Cited

U.S. PATENT DOCUMENTS 5,878,033 A 3/1999 Mouly
2003/0043786 A1 3/2003 Kall et al.
2003/0088695 A1* 5/2003 Kwak et al. ................ 709/238
2003/0194992 A1* 10/2003 Kim et al. ................ 455/414.1
2004/0081125 A1* 4/2004 Ranta-Aho et al. ........... 370/335
2005/0129018 A1* 6/2005 Casaccia et al. ............. 370/390
2006/0156370 A1* 7/2006 Parantainen ................ 725/132
2006/0189272 A1* 8/2006 Willenegger et al. ........ 455/3.01
2006/0229082 A1* 10/2006 Terry ........................... 455/450

OTHER PUBLICATIONS

3G Mobile Communication Technologies, May 8-10, 2002, Conference Publication No. 489 © IEE 2002 Multicasting in UMTS.
IEEE Communications Letters, vol. 5, No. 11, Nov. 2001 A Multicast Mechanism for Mobile Networks.

* cited by examiner

*Primary Examiner*—Duc Nguyen
*Assistant Examiner*—Julio R Perez
(74) *Attorney, Agent, or Firm*—Gary J. Cunningham (57) ABSTRACT

The present invention provides a method for receiving broadcast data in a system where broadcast data is transmitted on a plurality of frequencies. A user device monitors (302) a first frequency (108) for broadcast data to be transmitted on the first frequency. The device receives on the first frequency a notification of a broadcast data session which is to be sent on a second frequency (114) that is different from the first frequency. The device then determines a configuration associated with the second frequency and in accordance with receiving the broadcast data session and then configures (310) to receive the broadcast data session in accordance with the determined configuration. After receiving the broadcast data session, the device returns to monitoring the first frequency.

11 Claims, 7 Drawing Sheets

MULTICASTING DATA METHOD IN A RADIO COMMUNICATION SYSTEM

FIELD OF THE INVENTION

The present invention relates generally to the field of multicast and broadcast data services and, more particularly, to a method for directing user equipment to a data broadcast in a multifrequency communication network.

BACKGROUND OF THE INVENTION

Radiotelephone systems employ multiple channels, physical and logical, to communicate with user equipment. These systems are used to communicate both voice and data wirelessly. Communications in traditional cellular radiotelephone communication systems, first generation and second generation, generally involve voice communications and the transfer of small amounts of data. Larger data transmissions are limited as a result of bandwidth, technology and memory limitations. As a result, broadcasting or multicasting relatively large amounts of data to user equipment has therefore not been implemented in these systems.

Currently in the Global System for mobile communication (GSM) a service for short messaging known as the short message service (SMS) uses an SMS cell broadcast server (CBS) to broadcast data over a cell broadcast channel. This one channel is dedicated to the broadcasting of data and is dedicated for this purpose only. Although this is a broadcast implementation, it is suited for lower bit rates and does not lend it self to higher quality of service (QoS) of data streaming or high bit rates, hence the name short message service.

With the advent of faster second generation (2.5G) and new third generation (3G) communication systems, communicating larger amounts of data is now becoming possible, including broadcast and multicasting services. The practicality of broadcasting data to users is leading a plurality of broadcast services to become available. However, as a result of the increasing number of subscribers, the availability of increased data rates and varying broadcast services offered to the user, service providers or operators are deploying networks over multiple frequencies within the same area, allowing greater amounts of data and services to be carried to user equipment. As a result many services may be provided in one service area by one or more service providers and one or more networks. Some networks may employ both 2G and 3G networks together which inherently employs different frequencies. Additionally, in order to distribute user load, system operators assign user equipment to different frequencies. However, when broadcasting large amounts of information, this requires the network operators to allocate significant resources over all deployed frequencies in order to reach all users assigned to the multiple frequencies and transmit the same amounts of data simultaneously.

Consequently, there is a need for a method for use in a wireless communication system operating on multiple frequencies to route broadcast and multicast data to user equipment in an efficient manner.

DETAILED DESCRIPTION OF THE DRAWINGS

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

A method is herein disclosed for allowing user equipment, also known as a mobile station or user device, to receive high data rate services, or high bit rate service, from a plurality of available services. The system information sent on the broadcast (or notification) channel to additionally contain an indication of which frequency is carrying high data rate services, or services such as multicast and broadcast in general. The high data rate services, such as broadcast or multicasting data for example, of the invention are broadcast on multiple frequencies. The multiple broadcasts are either broadcast from one system or multiple systems having overlapping coverage areas.

In an exemplary embodiment of the invention, the user device is monitoring the assigned broadcast data frequency. The user device receives on a first frequency, which is the assigned broadcast data frequency for the user device, a notification of broadcast data to be sent on a second frequency. In this exemplary embodiment the broadcast data is multimedia broadcast and multicast message (MBMS) or the like. The notification message notifies the user device of the data and which channel or frequency it will be sent on; i.e. a second frequency different from the first frequency. The user device then determines a channel configuration associated with the second frequency in order to receive the MBMS data session. The user device then switches from the first frequency to the second frequency and sets the configuration to receive the MBMS data session. Once the MBMS data session has completed the data transmission, the user device returns to the first frequency.

Figure 1:
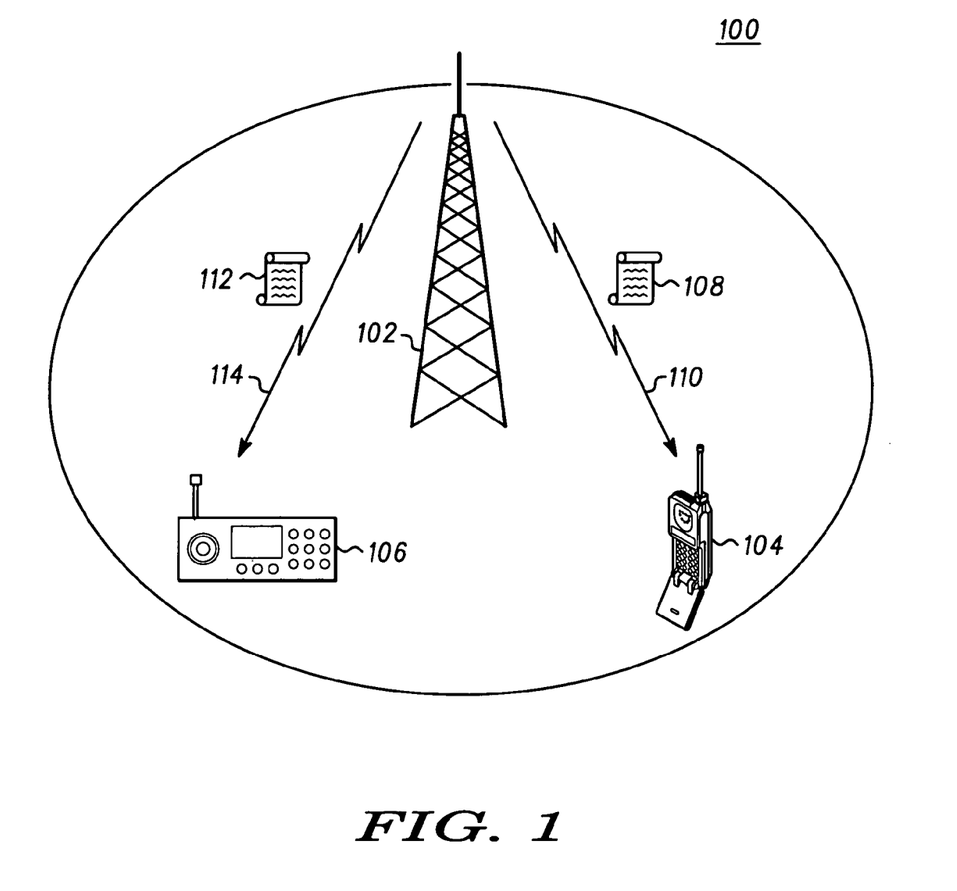
FIG. 1 is an exemplary communications system in accordance with the present invention.

Referring to FIG. 1, there is provided a wireless communication system 100 having broadcast or multicast service capability. A base station 102 is shown transmitting to a first user device 104 and a second user device 106. The base station 102 is a part of a network that comprises a radiotelephone network; this generally comprises a radio access network (RAN) coupled to one or more core networks (CN). For example the radiotelephone network may be a first, second or third generation network such as a universal mobile telecommunications system (UMTS) or the like, coupled to a packet data network and a circuit switched core network. In the exemplary communication system 100 shown, the base station 102 is capable of transmitting a first MBMS data set 108 on a first frequency 110, and a second MBMS data set 112 on a second frequency 114. The transmission of the first and second MBMS data sets 108, 112 may be dependant or independent. It should also be noted that the first frequency 110 may be transmitted from a first base station and the second frequency 114 from a second base station (not shown). Both transmissions being available to the first user device 104. One base station will be used for exemplary purposes of the disclosure. The first user device 104 is monitoring the first frequency 110 and the second user device 106 is monitoring the second frequency in this exemplary embodiment. The base station 100 transmits a notification message 116, on the second frequency 114, notifying the second user device 106 of a MBMS to be transmitted on the first frequency 110.

The second user device 106 configures to the first frequency 110 to receive the first MBMS data set 108, then returns to the second frequency 114 after the first MBMS data set 108 transmission is complete.

The first and second user devices 104, 106 are any type of devices that are capable of receiving broadcast data. The devices may be a radiotelephone as in the exemplary embodiment or any type of communication device such as, but not limited to, personal computers, PDA's, palm top computers, pagers, wireless internet devices and the like. The base station 100 may be a radiotelephone base station, such as a wide area network cellular system, a general broadcast transmitter such as TV or radio transmitters, or local area networks such as, but not limited to, WLAN including Bluetooth, 802.11, IrDA and the like. As one skilled in the art appreciates, the invention is not limited to these specific systems and can be embodied in or combinations of these or other communication systems as well.

Figure 2:
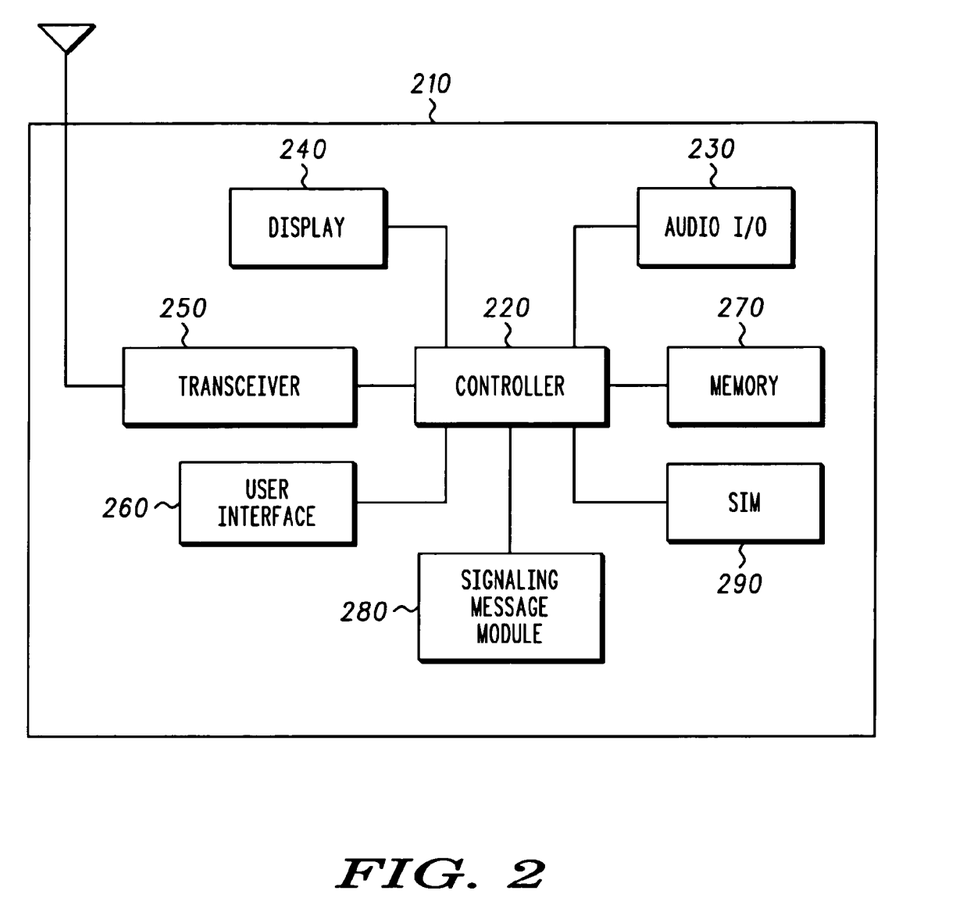
FIG. 2 is an exemplary block diagram of one or more user devices of FIG. 1.

In reference to FIG. 2, an exemplary block diagram of the user devices 104, 106 such as a UMTS terminal, according to the exemplary embodiment shown. The user devices 104, 106 may include a housing 210, a controller 220 coupled to the housing 210, audio input and output circuitry 230, a display 240 coupled to the housing 210, a transceiver 250, a user interface 260 coupled to the housing 210, and a memory 270. A broadcast data receiver module 280 can be coupled to the controller 220. The broadcast data receiver module 280 may be hardware coupled to the controller 220 or software located in the memory 270 and executed by the controller 220. The memory 270 can include allocated space for frequency configurations, or stored frequency configurations. The memory 270 may also include broadcast frequency configuration data or a list of broadcast frequency configurations may be stored in a subscriber identity module (SIM) 290 or Universal Subscriber Identity Module (USIM).

The transceiver 250 includes at least one transmitter and at least one receiver. The receiver is capable of receiving multiple carrier frequencies simultaneously. In particular, the receiver is capable of receiving at least signals from the first frequency 110 and the second frequency 114. The receiver may be the broadcast receiving module capable of receiving data from the first frequency 110 and the second frequency 114. The receiver may be capable of receiving high data rate (HDR) transmissions from two independent frequencies simultaneously.

Continuing with FIG. 2, the display 240 can be a liquid crystal display (LCD), a light emitting diode (LED) display, a plasma display, or any other means for displaying information. In the exemplary embodiment, the display on the radiotelephone presents the broadcast data received on either the first frequency 110 or the second frequency 114. The broadcast data may also be presented to the audio input and output circuitry 230 which can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a SIM, or any other memory that can be coupled to a mobile communication device.

Figure 3:
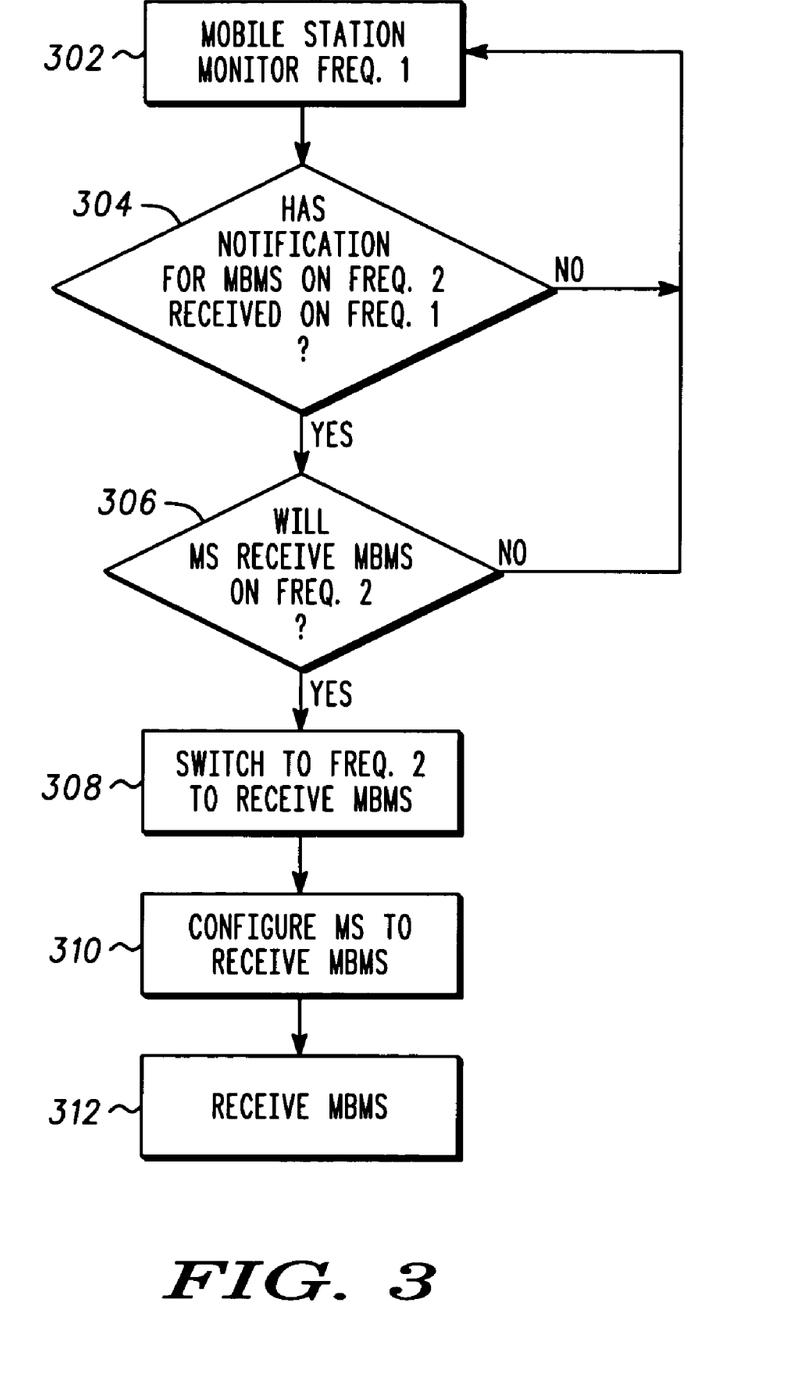
FIG. 3 is an exemplary flow diagram of frequency configuration in accordance with the present invention.

Referring to FIG. 3, an exemplary flow diagram for the setup of a broadcast data session is shown. In this exemplary embodiment the first user device 104 will be used, noting however that the first user device 104 or the second user device 106 can be interchanged. The user device 104 monitors 302 a first frequency 110 for broadcast information. In this exemplary embodiment, the first user device 104 is monitoring the first frequency 110 for a first MBMS data session. The user device 104 receives, on the first frequency 110, a notification of a second MBMS data session 112 to be sent on a different frequency. Once the user device 104 receives 304 the notification of the second MBMS data session 112, the user device 104 switches to the second frequency 114 for the reception of the second MBMS data session. The MBMS data is then received at the user device 104 on the second frequency 114. After the second MBMS data session 112 has been received, the user device 104 switches back to the first frequency. The mobile is paged on the channel it is camped on—even when receiving MBMS data In this embodiment, the user device has either subscribed or not subscribed to the second MBMS data session 112. If the user device has subscribed, then the steps as delineated above are followed. If not, the user may be prompted after receiving 304 the notification message of the second MBMS data session, to accept or deny reception of the second MBMS data session 112. If the user denies reception, the user device 104 remains camped, i.e. monitoring, on the first frequency 110.

Figure 4:
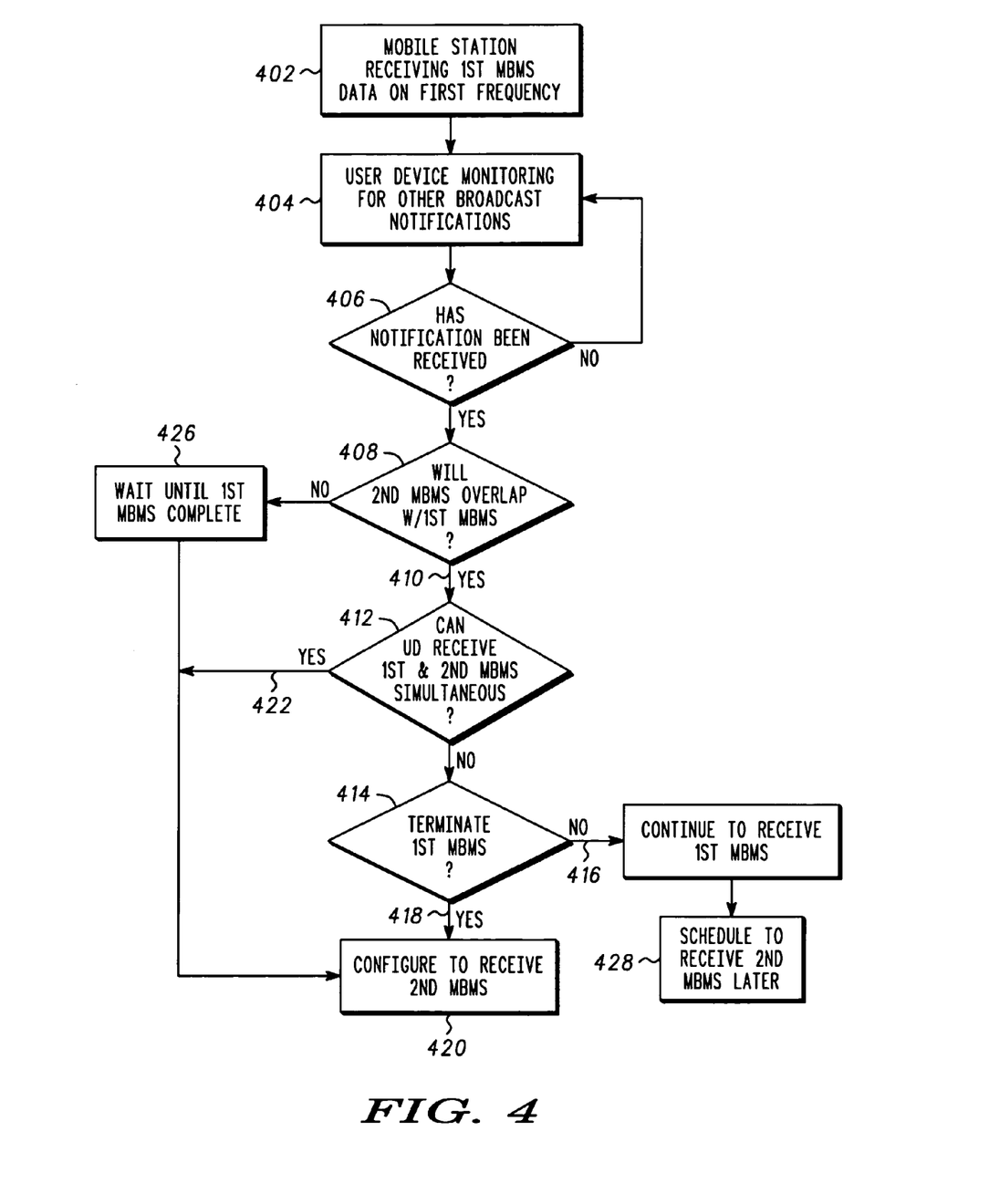
FIG. 4 is another exemplary flow diagram of frequency configuration in accordance with the present invention.

Referring now to FIG. 4, an exemplary flow diagram for the setup to broadcast data is shown. However in this embodiment, the user equipment 104 is already receiving 402 information, a voice call or data transfer, on the first frequency 110. In the exemplary embodiment, the first user equipment 104 is receiving a first MBMS data session 108 on the first frequency 110. During reception of the first MBMS data session 108, the user equipment 104 is monitoring 404 for a notification of a second MBMS data session 112 to be sent on a second frequency 114. The frequency on which the second MBMS data session 112 will be transmitted is sent as part of the notification. Once the user device 104 receives 406 a notification of the second MBMS data session 112, the user device 104 determines 408 when the second MBMS data session is scheduled to be transmitted. If transmission of the second MBMS data session 112 is to overlap 410 with the current transmission of the first MBMS data session 108, then the user device 104 must determine 412 if it can receive both MBMS data sessions 108, 114 simultaneously.

If the user device 104 is not capable of receiving multiple data sessions, the user or user device 104 must determine 414 whether to continue 416 with the current first MBMS data session 108 reception or terminate 418 the current first MBMS data session 108 reception. It is envisioned that the device would automatically continue to receive the first MBMS data session 108 if the user device 104 is not capable of receiving both the first and the second MBMS data. In one embodiment, the user may assign priorities to MBMS that the user has subscribed to. If a higher priority service is available the device may automatically terminate the current MBMS data session and begin to receive the second MBMS data session 112. If the user device 104 is to terminate the first MBMS data session 108, the first MBMS data session 108 is terminated 414. Then the user device 104 configures 420 to the second frequency to receive the second MBMS data session 112 on the second frequency 114. If the device 104 can receive broadcast data from multiple sources simultaneously 422, the user device 104 will configure to receive 420 and begin receiving the second MBMS data session while simultaneously receiving the first MBMS data session 108.

If the two data service sessions do not overlap 424 but the user device can not receive multiple data sessions simultaneously, the user device must wait 426 to configure to receive the second MBMS data session 112.

If the user device can not receive simultaneously and does not terminate 416 the first data session, the user device will either wait for another notification of the second MBMS data session or schedule to receive the second MMS data session at a later time 428. The notification of the MBMS data session to be transmitted on a second frequency may also include scheduling information. For example, the notification would include in addition to the frequency of the MBMS data session, the start time of that data session. The user device would not configure accordingly until a time just prior to the broadcasting of the second MBMS data session 112. If the broadcast data session is to be transmitted more than once, the scheduling information for each individual broadcast would be included in the notification. This would allow a user device already engaged in a data transfer, to determine when it can receive the second MBMS data session. Once the current data transfer is complete, the user device would configure to receive the second MBMS data session 112, either immediately after the completion of the data transfer or just prior to the start of the second MBMS data session 112.

The first frequency 110 for receiving broadcast data may be a part of one network, operated by a first service provider and the second frequency 114 may be a part of the same network and operated by the first service provider or a second network operated by the first service provider or a second service provider different then the first.

The data to be sent on the first frequency and the second frequency 114 may be the same service or data or a different service or data. Different broadcasts will be transmitted on different frequencies. In one embodiment, the same broadcast data is sent at multiple times either on the same frequency, the same frequency contiguously or on different frequencies. If the same broadcast data is sent on multiple frequencies, the transmissions may overlap, be temporally adjacent, or at different times which do not overlap.

The broadcast data can be any type of data but generally involves higher data rate transfers. Audio and video data are examples of high data rate content that may be provided as broadcast media. The audio and video data may be batch or streaming data. Real time gaming or application download services are other examples. One skilled in the art will appreciate that broadcast data can apply to numerous types of data and situations that are appropriate for broadcasting. For e.g. audio streaming, audio download, audio streaming or download with high or low quality video, video streaming, video downloads, video streaming with supplementary text for purposes of weather, advertising, news broadcasts, sports replays, music, video concerts, or the like.

Figure 5:
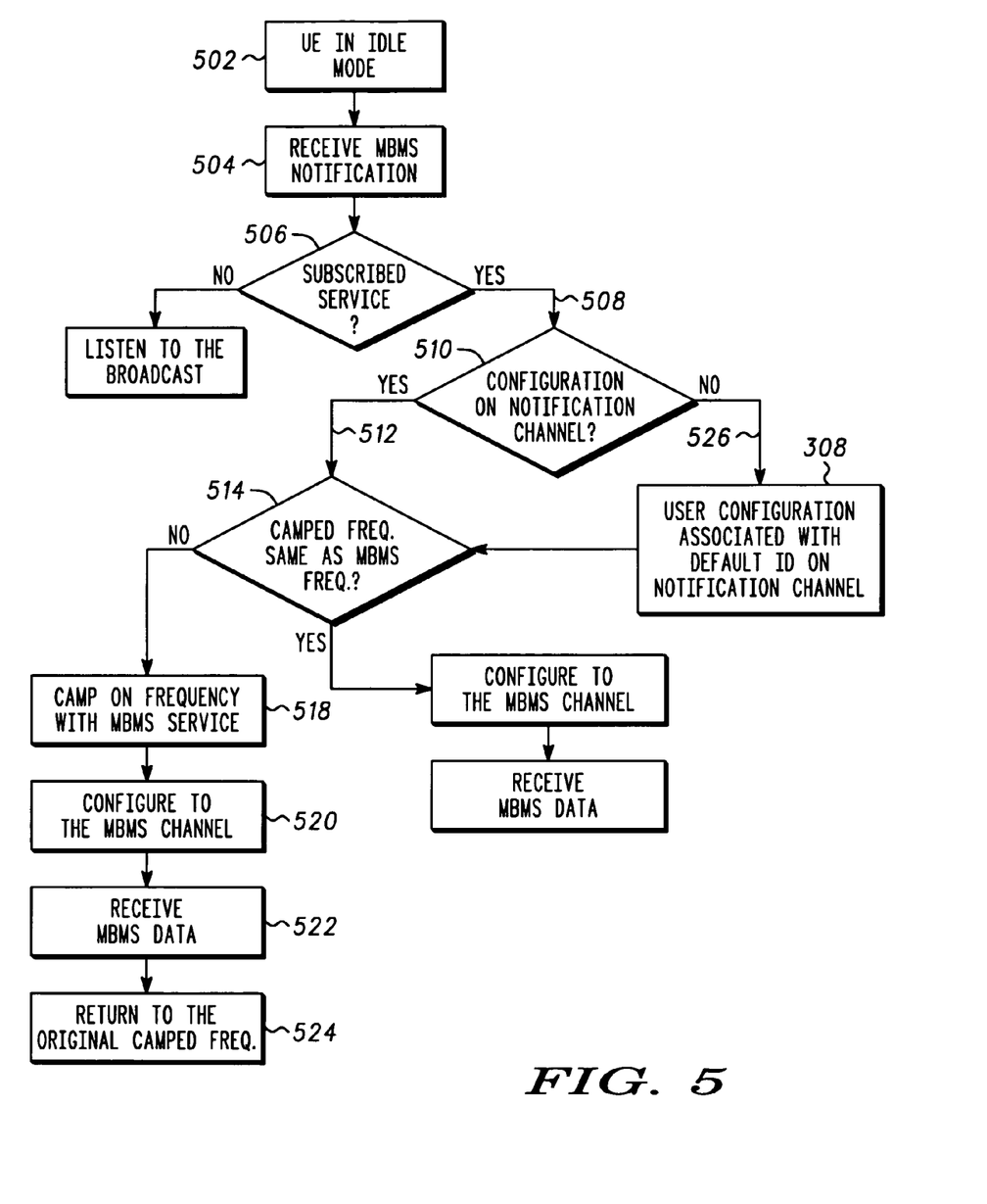
FIG. 5 is still another exemplary flow diagram of frequency configuration in accordance with the present invention.

Referring to FIG. 5, an exemplary flow diagram for receiving a MBMS notification message is shown. In this exemplary embodiment, the user device 104 is in idle mode and not engaged in any data transfer, i.e. monitoring 502 the broadcast control channel (BCCH) any may additionally monitor a notification control channel. The user device 104 receives 504 a notification on the BCCH or the Notification channel, that a MBMS will be transmitted and the frequency on which the MBMS data will be transmitted. The user device 104 determines 506 if the MBMS, of the notification message, has been subscribed to by the device 104. At this point the user may also opt to receive the MBMS data session if it has not been subscribed to prior to reception of the notification message. If the user device 104 has or does subscribe 508 to the MBMS and the device 104 is enabled to receive the MBMS data session, the user device 104 then determines 510 if a channel configuration associated with the MBMS data session has been sent along with the notification message. If the configuration has been sent 512 with the notification, the device 104 must determine 514 if the MBMS data session is to be sent on the same frequency the user device 104 is currently monitoring (Camped on), or if the MBMS data session is to be sent on a different frequency. If the MBMS data session is to be sent on a different frequency 516, the user device 104 must camp 518 on a second frequency 114 on which the MBMS data session is to be sent. Next the user device 104 must configure 520 to receive the MBMS data session on the second frequency.

In addition it is also envisioned that instead of providing complete radio configurations taking up radio bandwidth, user devices would be provided with a configuration identity of predefined/default configurations to be used which are store in the user device 104. The configuration identity would provide all necessary information, such as logical and transport channel configuration, transport format combination configuration, or the like. This would then ensure that devices that need to reselect or reconfigure to another frequency, do not waste any time on another frequency in gathering the needed channel configuration information. Instead the user devices can pre-configure themselves immediately after the reselection to a second frequency which is performed just prior to start of MBMS data session. In the case of pre-defined configurations, broadcasting them on every frequency would also lead to an inefficient use of radio resources and in this case default configurations may be more appropriate.

As mentioned above, users or user devices may be engaged in a service (e.g. voice call) on the camping frequency and thus may not be able to re-select or configure to the broadcast or multicast serving frequency. It is envisioned however that the service would be repeated multiple times in order to ensure successful reception and thus appropriate indications of upcoming multicast broadcast services can be provided to the user device 104 which can then make a choice to continue with the present call or move to the other broadcast service.

In yet another exemplary embodiment, users in a voice call may also be provided a dedicated channel for the multicast data service. It should also be noted that it may be preferable that the choice of which frequency to multicast/broadcast data on would be dependant on how many users are assigned or camped on a given frequency and currently engaged on a voice call. Thus, depending on the number of users on the system, the system would determine if it is appropriate to broadcast the data on a common broadcast channel, for example the BCCH, or the multicast channel mapped to the Forward access control channel (FACH), or to multicast the data on a dedicated channel to each subscriber to the service.

Continuing with FIG. 5, if the channel configuration has not been sent 526 along with the MBMS notification message, the user device 104 will use a configuration code book to determine the configuration that is to be used with the frequency of the MBMS to be received. As mentioned above the notification may send an identity that can be correlated with a configuration in the code book installed in the user device or on the user's SIM. The code book is pre-stored in the user device or on the SIM. The code book may be stored when the user subscribes to the service or installed by the service provider. The installation of the code book can be via a hard wired cable or over the air. The code book stores the necessary information in relation to the given frequency. For example, the code book may contain the channel configuration which may include a transport format set, TTI, channelization code, the bearer configuration. The bearer configuration includes the RLC PDU size, RLC mode and the RLC mode parameters. This information is stored in the code book and associated with each frequency, or channel, sent in the MBMS notification message. When the user device receives the MBMS frequency in the notification of the MBMS, the device searches for the frequency in the code book. When the match is found, the user device 104 uses the configuration associated with the frequency in the code book, to configure the user device 104 to receive the MBMS data.

Figure 6:
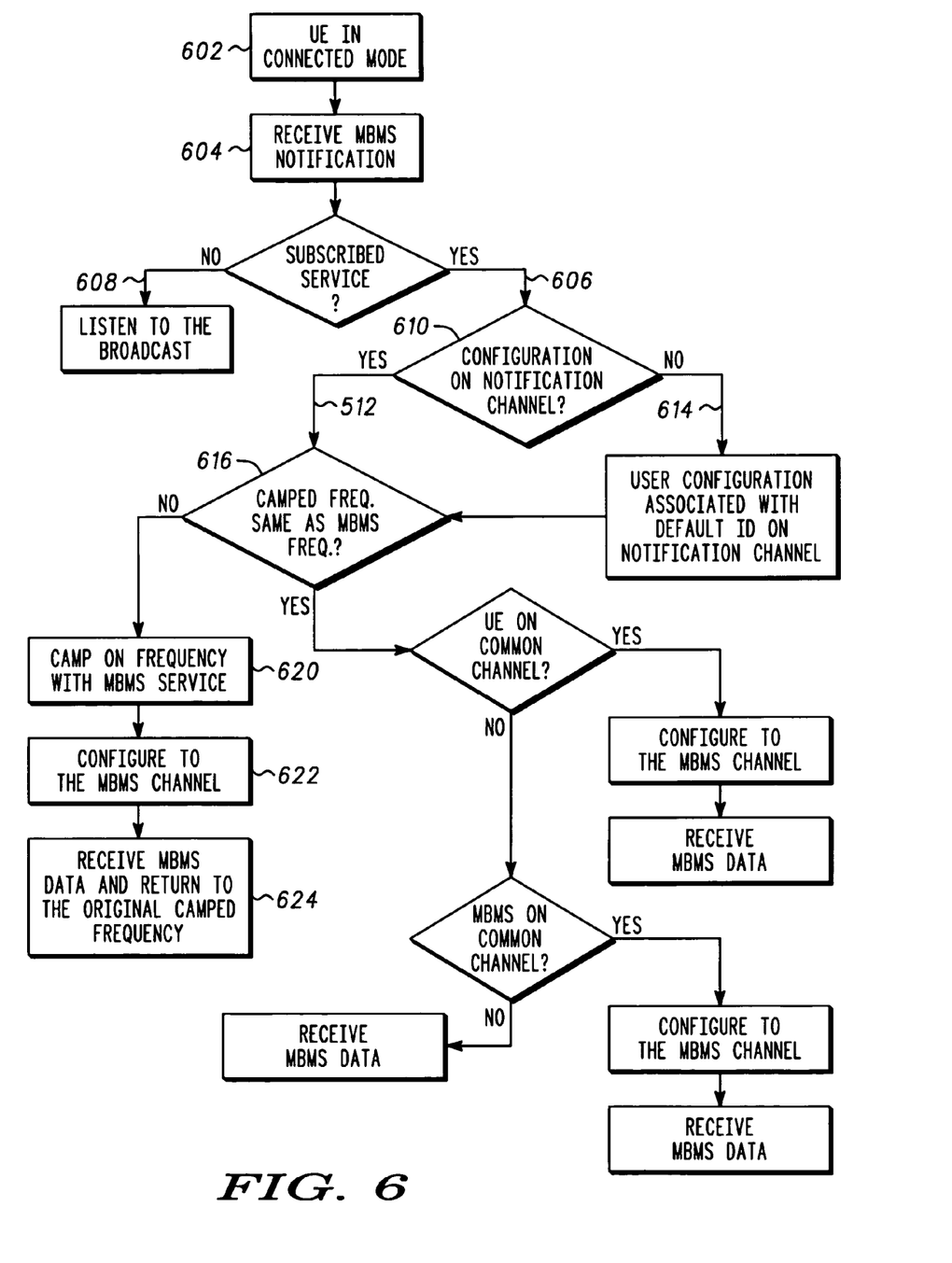
FIG. 6 is yet another exemplary flow diagram of frequency configuration in accordance with the present invention.

In another exemplary embodiment shown in FIG. 6, the user device 104 is already engaged in receiving information, such as a voice call as discussed above or other data services. In the exemplary embodiment, the user device 104 is receiving 602 MBMS data on the first frequency 110. While receiving the data, the user device 104 receives 604 a notification for a second MBMS data session, including the second MBMS data session broadcast frequency and/or identity, available to be received by the user device 104. If the user device 104 subscribes to the second MBMS, or the user decides to receive the second MBMS, the user device goes on to configure to receive the second MBMS. If the user device 104 does not subscribe 608 to the second service, the user device 104 continues to receive the first MBMS.

When the user device 104 has subscribed 606 to the service, the user device 104 must determine 610 if the configuration has been received from the notification message 612 or if is to retrieve 614 the configuration information from memory 270 in the user device 104. Next, the user device 104 determines 616 if the first frequency 108 that it is currently camped on is the same frequency as the second frequency 114 of the second MBMS data session 112. If the second frequency 114 of the second MBMS data session 112 is different than the first frequency 110, then the device 104 camps 620 on the second frequency 114. The user device 104 configures to receive the broadcast data session in accordance with the determined configuration.

Once the user device has received the broadcast data session, the user device 104 returns to the original frequency, the first frequency, in the embodiment. The original frequency is the channel the user device 104 defaults to camping on for receiving broadcast data. A device that is already camped on a frequency on which the broadcast data is to be sent automatically begins receiving the broadcast data, provided that the broadcast data service has been subscribed to.

Figure 7:
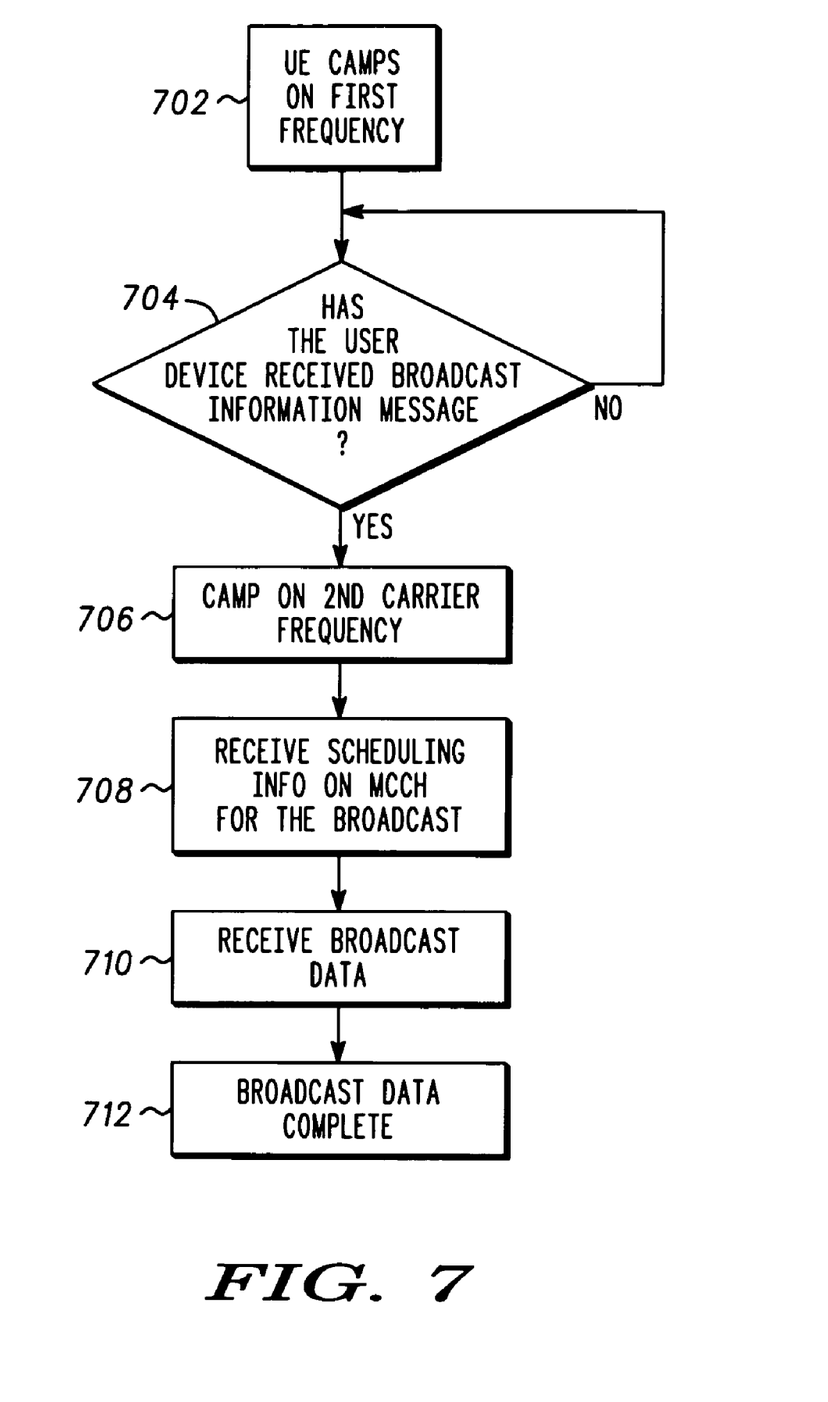
FIG. 7 is a further exemplary flow diagram of frequency configuration in accordance with the present invention.

In another embodiment, illustrated in FIG. 7, the user device 104 camps 702 on a frequency associated assigned by the service provider of the device. In this exemplary embodiment, the user device is camped on the frequency for broadcast data and is waiting for the information to be sent. Camping on a frequency awaiting information is generally known. The user device 104 is assigned the frequency either because it is the only frequency of its type in the system or, as the result of balancing user devices across a plurality of frequencies in the system. The method of camping in this exemplary embodiment, wherein the user device 104 has access to a plurality of broadcast frequencies within the same geographical area, comprises first camping 702 on a first carrier frequency. This is the frequency the user device is assigned by system to which the user device is associated or is the frequency the user device camps on through cell (i.e. base station) selection procedures.

The user device 104 receives 704 a broadcast semi-static information message for a service redirection on the first carrier frequency. In the exemplary embodiment the semi-static information message is sent on the broadcast control channel (BCCH) or the multicast control channel (MCCH) of the frequency the user device is camped on. The semi-static information message includes a channel assignment, indicating maybe a second carrier frequency, the channelization code the broadcast data will be transmitted on. The user device 104, then camps 706 on the second frequency in preparation to receive the broadcast data. In the exemplary embodiment the second frequency is a MBMS Control Channel (MCCH). Then the user device receives 708 a notification on the MCCH, indicating the start of a broadcast data session on the second carrier frequency, just prior to the start of the data session. The MCCH is associated with the second carrier frequency. The user device 104 receives 710 the broadcast data. Once the broadcast data session has completed 712, the user device 104 returns to camping on the first carrier frequency.

In another embodiment, a dynamic camping method is provided. In the dynamic camping method, the semi-static information for the service re-direction is broadcast over the BCCH. This broadcast includes parameters of the different radio configuration. The user device 104 then camps on the second carrier that it was redirected to in response to the semi-static information message for the service re-direction. Different user devices may be directed to the same carrier frequency or to a plurality of carrier frequencies in accordance with system loading parameters. Next the user device 104 will receive over the MCCH, corresponding to the assigned carrier frequency i.e. the second carrier frequency, a notification message before the session start. The user device 104 only camps on the selected frequency during the duration of the broadcast data session duration. After the broadcast data session terminates, the user device 104 will return back to its original frequency, the first carrier frequency.

Similarly the network, and more particularly the RNC, the BSC or the like controls broadcasts to the mobile stations. The base station transmits the broadcast to the user devices. In accordance with FIG. 7, the base station broadcasts a semi-static information message for a service redirection on the first carrier, on which at least one user device 104 is camped. The base station sends a start of data session notification on a plurality of MCCH, prior to the start of the data session. If the system has only one MCCH then the base station sends a start of data session notification on that single MCCH. Then the case station sends the broadcast data.

A data service may be broadcast or multicast to the user device 104. Depending on the system configuration and user loading and type of data, the data may be broadcast to all devices on one frequency or channel or multicast to a selection of individual devices based on registration and subscription to a particular MBMS session. The invention herein described applies equally to both broadcast and multicast transmissions. Broadcast data sessions were used as exemplary implementations throughout this disclosure but it is understood by one skilled in the art that the invention applies to multicasting as well.

One broadcast frequency may be dedicated to one service or may transmit multiple services. In the case of multiple services being multicast or broadcast, the notification or broadcast control information can be sent on a service specific basis. Thus for example, the operator may also choose to multicast or broadcast different services on different frequencies; i.e. broadcast service type 1 on frequency F1, broadcast service type 2 on frequency F2 and so on. Users subscribed to service type 1 but camped on frequency F2 would then re-select and configure to F1 just prior to service availability, while users subscribed to service type 2 but camped on F1 would reselect and configure to frequency F2. Users on F1 and subscribed to service type 1 would remain on F1. In the general case when multiple services are being supported, the notification channel would provide indication for each of the service identities. Even if users simultaneously subscribe to services that are being transmitted simultaneously, and as discussed above, some devices may be capable of receiving multiple broadcast data sessions.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for receiving broadcast data, at a user device where multiple data services are available on a plurality of frequencies, the method comprising:
    monitoring a first carrier frequency for a multimedia broadcast and multicast service (MBMS) data session;
    receiving a notification on the first carrier frequency of a MBMS data session which is to be transmitted on a second carrier frequency different from the first carrier frequency, wherein the notification includes an identification of the second frequency;
    determining a configuration associated with the second carrier frequency to enable reception of the MBMS data session on the second carrier frequency; and
    configuring the user device to the second carrier frequency to receive the MBMS data session.

2. The method according to claim 1, further comprising reselecting from the first carrier frequency to the second carrier frequency.

3. The method according to claim 1, further comprising receiving a first MBMS data set on the first carrier and receiving a second MBMS on the second carrier frequency.

4. The method according to claim 1, wherein the configuration associated with the second carrier frequency is stored in a memory in the user device.

5. The method according to claim 1, wherein the configuration associated with the second carrier frequency is a subset of a plurality of configurations stored in the user device.

6. The method according to claim 5, wherein the notification includes a configuration ID that correlates to the configuration of the plurality of configurations stored in the user device.

7. The method according to claim 1, wherein the configuration associated with the second carrier frequency is transmitted to the user device.

8. The method according to claim 1, further comprising:
    selecting the second carrier frequency for the duration of the MBMS data session; and
    selecting the first carrier frequency after completion of the MBMS.

9. The method according to claim 1, further comprising receiving the MBMS data session via one of either broadcast or multicast communication.

10. A method in user device for receiving multicast and broadcast information sent on multiple frequencies, the method comprising:
    receiving a data set comprising frequency configurations for multicast and broadcast frequencies;
    monitoring a first frequency for a multimedia broadcast and multicast message (MBMS) notification;
    receiving a notification on the first frequency of a MBMS to be transmitted on at least one of a plurality of frequencies different than the first frequency, wherein the notification includes a configuration identity associated with the MBMS;
    determining a configuration that matches the configuration identity of the at least one of a plurality of frequencies from the data set; and
    configuring, at a time just prior to the start of the MBMS transmission to the configuration that matches the configuration identity to receive the MBMS.

11. The method according to claim 10, further comprising receiving on one of the at least one of a plurality of frequencies the MBMS session of the notification.

* * * * *